United States Patent
Ha

(10) Patent No.: US 7,278,773 B2
(45) Date of Patent: Oct. 9, 2007

(54) BACKLIGHT UNIT FOR LIQUID CRYSTAL DISPLAY

(75) Inventor: Hoon-Soo Ha, Gyeongju-si (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/956,909

(22) Filed: Oct. 1, 2004

(65) Prior Publication Data

US 2005/0073828 A1 Apr. 7, 2005

(30) Foreign Application Priority Data

Oct. 2, 2003 (KR) ............... 10-2003-0068814

(51) Int. Cl.
*F21V 7/04* (2006.01)
*G01D 11/28* (2006.01)
(52) U.S. Cl. ............... 362/623; 362/626; 362/613
(58) Field of Classification Search ............... 362/27, 362/606, 607, 608, 609, 610, 613, 614, 615, 362/623, 625, 626
See application file for complete search history.

(56) References Cited

U.S. PATENT DOCUMENTS

| 5,590,945 | A | * | 1/1997 | Simms | ............... 362/623 |
| 5,914,759 | A |   | 6/1999 | Higuchi et al. | |
| 6,305,811 | B1 | * | 10/2001 | Beeson et al. | ............... 362/626 |
| 6,629,764 | B1 | * | 10/2003 | Uehara | ............... 362/609 |
| 6,921,178 | B2 | * | 7/2005 | Ohkawa | ............... 362/626 |
| 7,048,428 | B2 | * | 5/2006 | Tahara et al. | ............... 362/626 |
| 2003/0016930 | A1 | | 1/2003 | Inditsky | |
| 2003/0081402 | A1 | | 5/2003 | Jeon et al. | |
| 2003/0160911 | A1 | | 8/2003 | Kano | |

OTHER PUBLICATIONS

Notification dated Jun. 23, 2006 from the German Patent Office for Application No. 10 2004 037033.8-51.
Office Action for corresponding German Patent Application Serial No. 10 2004 037 033.8-51 Jun. 23, 2007.

* cited by examiner

*Primary Examiner*—Y. My Quach-Lee
(74) *Attorney, Agent, or Firm*—Brinks Hofer Gilson & Lione

(57) ABSTRACT

A backlight unit for a liquid crystal display device includes a lamp, a lamp housing surrounding the lamp with an opening, a prism light guide plate having a first side corresponding to the opening and having prisms at a lower surface thereof, the prism light guide plate including a first portion of an even surface at the lower surface adjacent to the lamp, and a reflector opposite the lower surface of the prism light guide plate.

21 Claims, 6 Drawing Sheets

BACKLIGHT UNIT FOR LIQUID CRYSTAL DISPLAY

The present invention claims the benefit of Korean Patent Application No. 2003-0068814, filed in Korea on Oct. 2, 2003, which is hereby incorporated by reference for all purposes as if fully set forth herein.

BACKGROUND

1. Field

The present invention relates to a light source for a liquid crystal display (LCD) device, and more particularly, to a backlight unit for the liquid crystal display (LCD) device.

2. Discussion of the Related Art

Flat panel display (FPD) devices that are small, lightweight, and have low power consumption have been a subject of recent research in the advent of the information age. Among many kinds of FPD devices, a liquid crystal display (LCD) device is widely used for notebook computers and desktop monitors because of its excellent characteristics of resolution, color display and display quality.

In general, a liquid crystal display (LCD) device includes two substrates spaced apart and facing each other, and a liquid crystal layer interposed between the two substrates. Each of the first and second substrates includes an electrode, whereby the electrodes of the first and second substrates face each other. When a voltage is applied to each of the electrodes, an electric field is induced between the electrodes. Accordingly, an alignment of liquid crystal molecules of the liquid crystal layer is changed by the varying intensity or direction of the induced electric field. Thus, the LCD device displays an image by varying the transmittance of light through the liquid crystal material layer based upon the arrangement of the liquid crystal molecules.

Since the LCD device does not emit light and controls the transmittance of light, an additional light source is necessary. Accordingly, the LCD device displays images by disposing a backlight at a backside of a liquid crystal (LC) panel, providing the LC panel with light from the backlight, and transmitting the light according to the arrangement of the liquid crystal molecules.

The backlight may be classified into a direct-type and an edge-type depending on position of a light source with respect to a display area. In the direct-type backlight, light sources, such as lamps, are disposed right under the display area, whereby light from the lamps is directly irradiated on substantially an entire surface of the LC panel. Thus, the direct-type backlight does not need a light guide plate. On the other hand, in the edge-type backlight, since one or more lamp is disposed at one or more edge of the display area, to transmit light from the lamp toward a front side of the backlight, the light guide plated is required.

In general, the edge-type backlight may be used for notebook computers or LCD monitors because the edge-type backlight has less stained brightness, thin thickness, and low power consumption. The direct-type backlight may be used for high brightness display devices. A related art edge-type backlight will be described hereinafter with reference to attached drawings.

FIG. 1 is a cross sectional view of an edge-type backlight unit for an LCD device according to the related art. As illustrated in FIG. 1, in an edge-type backlight unit 1, a lamp 20 and a lamp housing 22 are disposed at a side of a light guide plate 24. The lamp 20 serves as a linear light source, and the lamp housing 22 surrounds the lamp 20. The light guide plate 24 changes linear light from the lamps 20 at the side thereof into planar light. Dot patterns 25 are formed at a lower side of the light guide plate 24 to form uniform planar light by diffusing light. The dot patterns 25 are formed by a printing method.

A diffusing sheet 18, first and second prism sheets 14 and 16, and a passivation film 12 are sequentially arranged over the light guide plate 24. A reflecting plate 26 is disposed under the light guide plate 24 to prevent leakage of the light.

The lamp 20 is a light source that is supplied with high voltage to generate visible light. The lamp 20 is classified into two types: a cold cathode fluorescent lamp and a hot cathode fluorescent lamp. The lamp 20 irradiates the visible light by emitting electrons from a cathode due to a voltage supplied from the outside and the emitted electrons then collide with fluorescent substances. The lamp housing 22 reflects light emitted from the lamp 20 toward the light guide plate 24.

The light guide plate 24 provides the light emitted from the lamp 20 or the light reflected at the lamp housing 22 toward a front side of the backlight unit 1 by total reflection. At this time, the dot patterns 25 at the lower side of the light guide plate 24 effectively diffuse the totally reflected light.

The diffusing sheet 18 comprises a polyester film and spherical patterns formed on the polyester film. The polyester film includes polyethyleneterephthalate (PET) and the spherical patterns include acrylic resin. The diffusing sheet 18 diffuses light diffusively reflected from the light guide plate 24 and uniformly provides the light to substantially the entire surface of an LC panel (not shown) to thereby equalize the brightness of the LCD device.

Each of the first and second prism sheets 14 and 16 comprises a polyester film and prisms formed on the polyester film. The polyester film includes PET, and the prisms include acrylic resin. Each of the prisms has a triangular cross-section. The first and second prism sheets 14 and 16 condense light dispersed in various angles passing through the diffusing sheet 18 toward a normal direction with respect to the LC panel (not shown). The first and second prism sheets 14 and 16 are arranged such that prism peaks of the first prism sheets 14 are perpendicular to prism peaks of the second prism sheet 16.

The reflector 26 under the light guide plate 24 includes a polyester material. The reflector 26 reflects light emitted from the lower side of the light guide plate 24 toward the upper side of the light guide plate 24.

In the above backlight unit, the diffusing sheet 18, the first and second prism sheets 14 and 16, and the passivation film 12, which function differently, are disposed between the light guide plate 24 and the LC panel (not shown). However, the sheets cost a substantial amount to fabricate, which thereby increases the cost of the overall backlight unit.

Using a prism light guide plate, which includes prisms at a surface thereof, has been proposed and developed. The prism light guide plate decreases the number of sheets used in the backlight unit.

FIG. 2 is an upper perspective view of a prism light guide plate according to the related art. As shown in FIG. 2, prisms 51, which have cross sections of inverted triangular shapes, are formed at a lower surface of a light guide plate 50. The prisms 51 of FIG. 2 have sides that are either symmetrical or non-symmetrical. The prisms 51 at the lower surface of the light guide plate 50 condenses light toward a front side of the light guide plate 50 better than the dot patterns 25 of FIG. 1, which thereby increases the brightness of the LCD device.

FIG. 3 is a cross-sectional view of a backlight unit including the prism light guide plate of FIG. 2 according to the related art.

As shown in FIG. 3, in the backlight unit 40, a lamp 70 and a lamp housing 72 surrounding the lamp 70 are disposed at a side of the prism light guide plate 50. The prism light guide plate 50 has prisms 51 at a lower surface thereof. A prism sheet 60 including prisms (not shown) at an upper surface thereof is disposed over the prism light guide plate 50 such that prism peaks of the prism sheet 60 are perpendicular to prism peaks of the prism light guide plate 50. A passivation film 62 is disposed over the prism sheet 60.

In the backlight unit 40 including the prism light guide plate 50, the diffusing sheet 18 of FIG. 1 and one of the first and second prism sheets 14 and 16 of FIG. 1 are omitted. Additionally, the prism light guide plate 50 condenses light to a greater extent than the light guide plate 24 of FIG. 1 including the dot patterns 25 to thereby provide a high brightness backlight unit 40.

FIG. 4A is a cross-sectional view of a liquid crystal display device including the backlight unit of FIG. 3 according to the related art. FIG. 4B is an enlarged view of the region "A" of FIG. 4A. In FIGS. 4A and 4B, a bottom case and a top case are not illustrated.

As shown in FIGS. 4A and 4B, a lamp 70 is disposed at a side of a prism light guide plate 50, and a lamp housing 72 covers the lamp 70 with an opening. The opening of the lamp housing 72 corresponds to the side of the prism light guide plate 50. The prism light guide plate 50 changes the path of light emitted from the lamp 70 at the side thereof toward an upper side of the prism light guide plate 50. The prism light guide plate 50 has prisms 51 of inverted triangular shapes on substantially the entire lower surface thereof. A reflector 76 is disposed over the lower surface of the prism light guide plate 50. A prism sheet 60, a passivation film 62 and a liquid crystal panel 80 are sequentially disposed over an upper surface of the prism light guide plate 50.

A lower end of the lamp housing 72 partly overlaps the reflector 76 and an upper end of the lamp housing 72 contacts an end of the prism light guide plate 50. The prism sheet 60 and the passivation film 62 are spaced apart from the upper end of the lamp housing 72 and are in contact with the upper surface of the prism light guide plate 50.

In the liquid crystal display device including the backlight unit 40 having the prism light guide plate 50, light condensed by the prisms 51 of the prism light guide plate 50 is transmitted upward the prism light guide plate 50. However, light leakage occurs at an edge of the liquid crystal panel 80, more particularly, at a light-entering portion of the prism light guide plate 50 due to the collimation by the prisms 51 of the prism light guide plate 50. Since the light emitted from the lamp 70 is incident first on the light-entering portion, the light in the light-entering portion is stronger and brighter than light at an opposite end of the prism light guide plate 50. Therefore, if the light at the light-entering portion is condensed and transmitted into the edge of the liquid crystal panel 80, a large amount of light leakage may occur at the edge of the liquid crystal panel 80.

BRIEF SUMMARY

As embodied and broadly described, in one embodiment, a backlight unit includes at least one lamp, a prism light guide plate having at least one edge face irradiated by the lamp, and prisms at a lower surface thereof, the prism light guide plate including at least one portion of an even surface at its lower surface adjacent to the lamp. This portion does not comprise prisms.

In another embodiment, the backlight unit contains one or more lamps and a light guide plate. The light guide plate contains a lower surface having portion(s) extending from the lamp(s) that condense light from the lamp(s) to a smaller extent than a portion more distal to the lamp(s).

In another embodiment, the light guide plate contains means for condensing light in the light guide plate from the lamp(s) to a lesser degree in the edge(s) than in a center of the light guide plate.

It is to be understood that both the foregoing general description and the following detailed description are exemplary and explanatory and are intended to provide further explanation of the invention as defined by the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
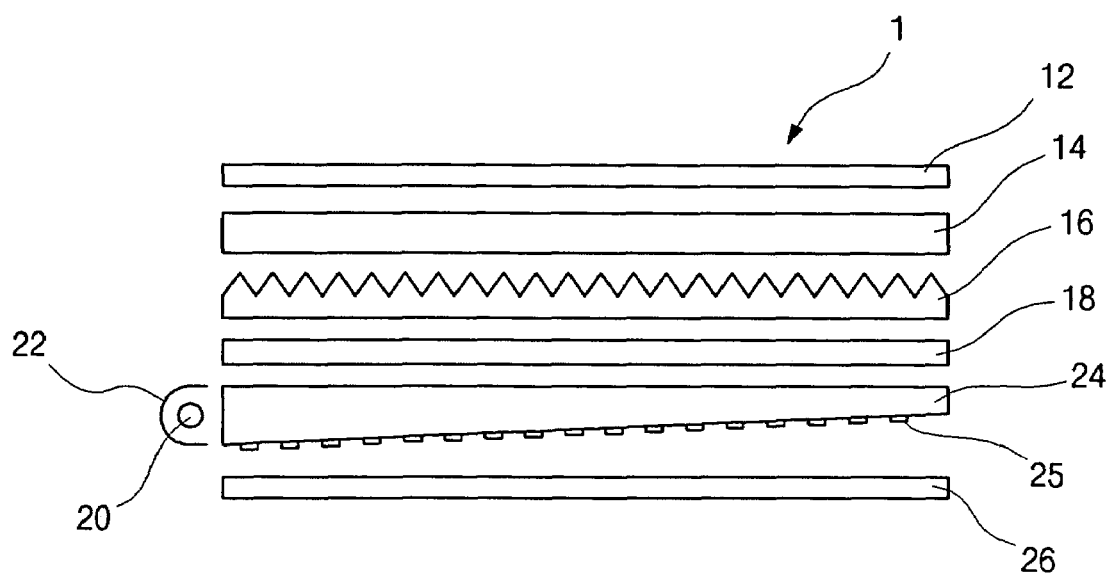
FIG. 1 is a cross sectional view of an edge-type backlight unit for an LCD device according to the related art.
Figure 2:
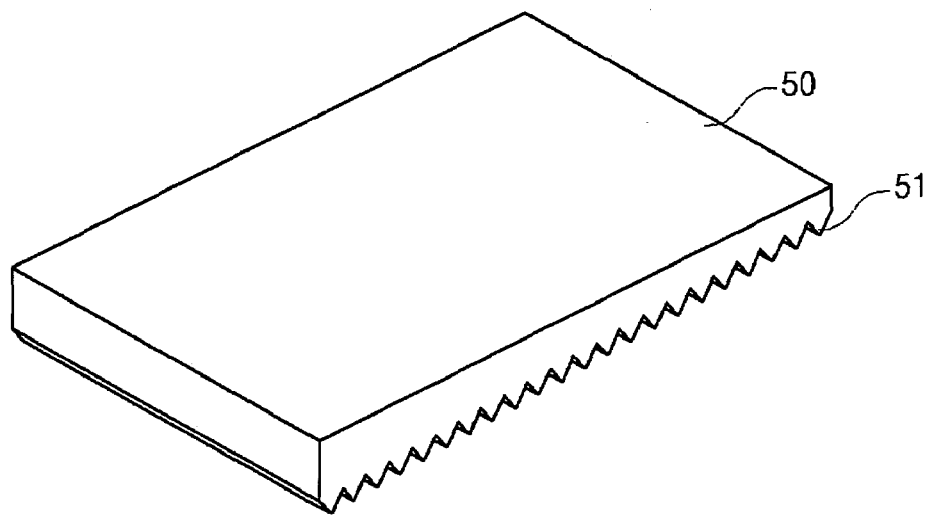
FIG. 2 is an upper perspective view of a prism light guide plate according to the related art.
Figure 3:
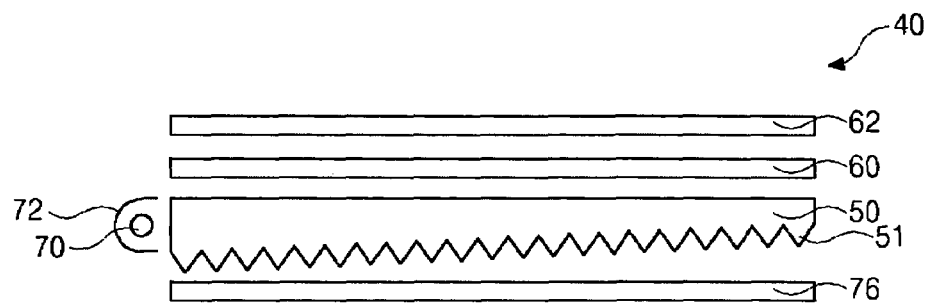
FIG. 3 is a cross-sectional view of a backlight unit including the prism light guide plate of FIG. 2 according to the related art.
Figure 4A:
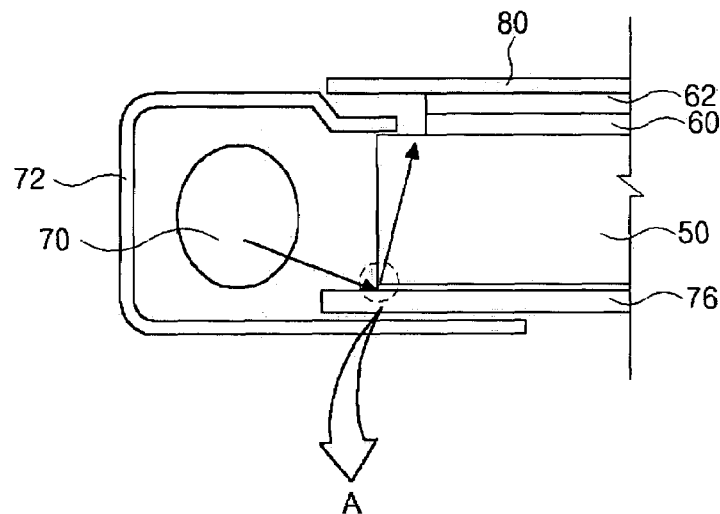
FIG. 4A is a cross-sectional view of a liquid crystal display device including the backlight unit of FIG. 3 according to the related art.
Figure 4B:
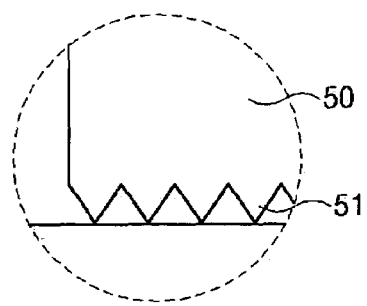
FIG. 4B is an enlarged view of the region "A" of FIG. 4A.
Figure 5A:
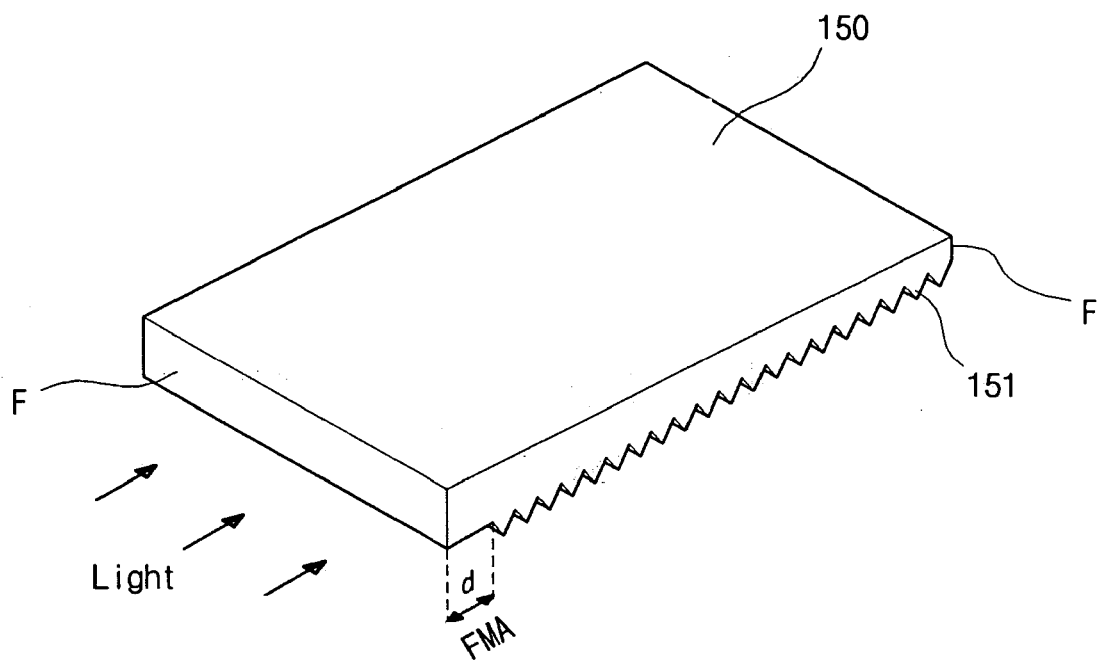
FIGS. 5A and 5B are upper perspective views of prism light guide plates according to a first embodiment of the present invention.
Figure 5B:
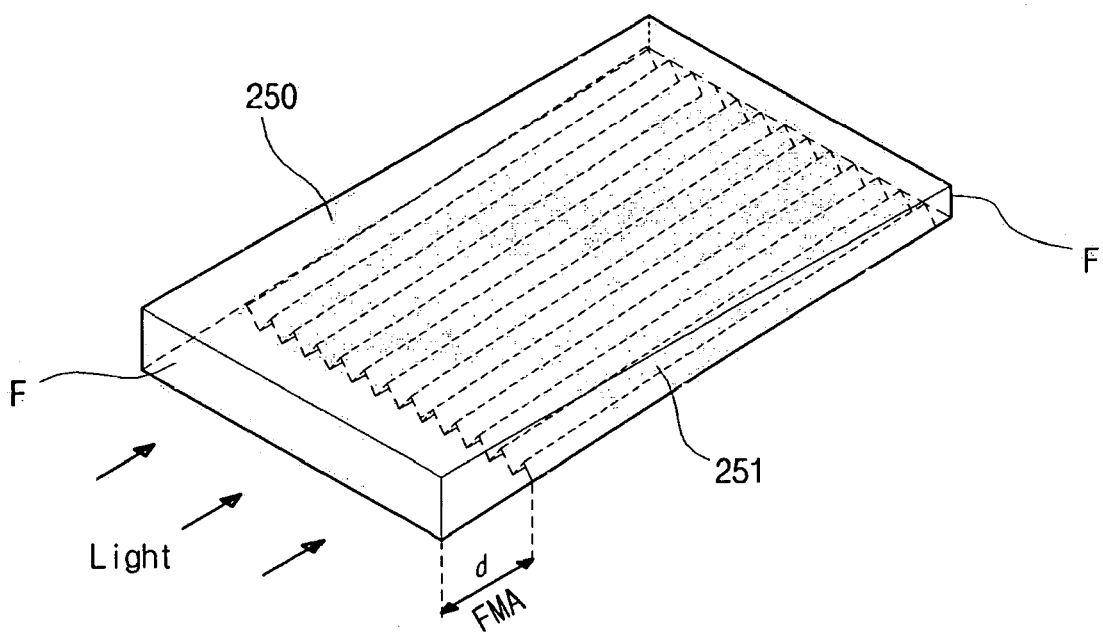
Figure 6A:
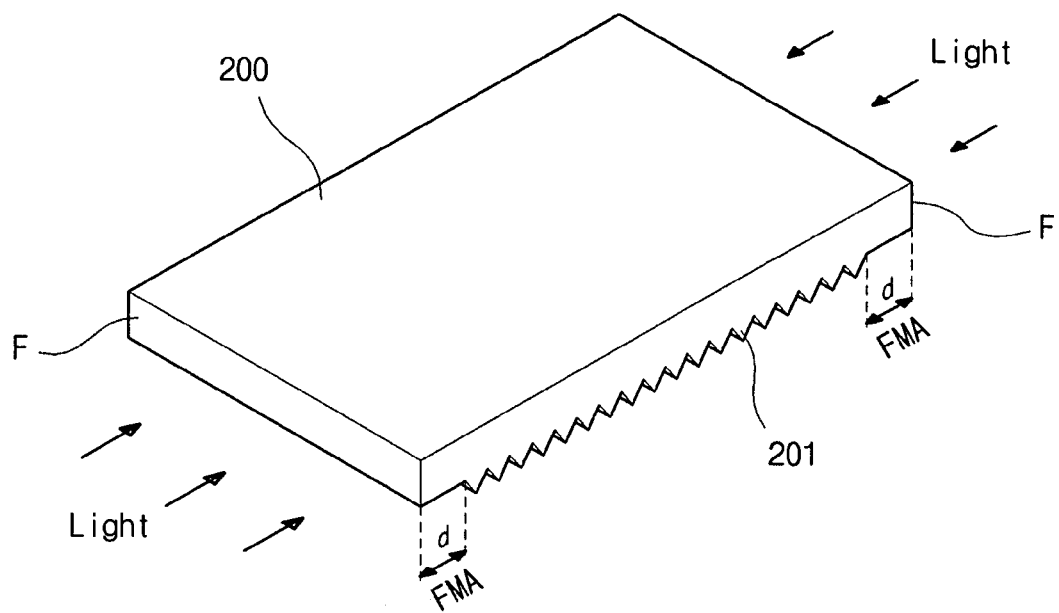
FIGS. 6A and 6B are upper perspective views of prism light guide plates according to a second embodiment of the present invention.
Figure 6B:
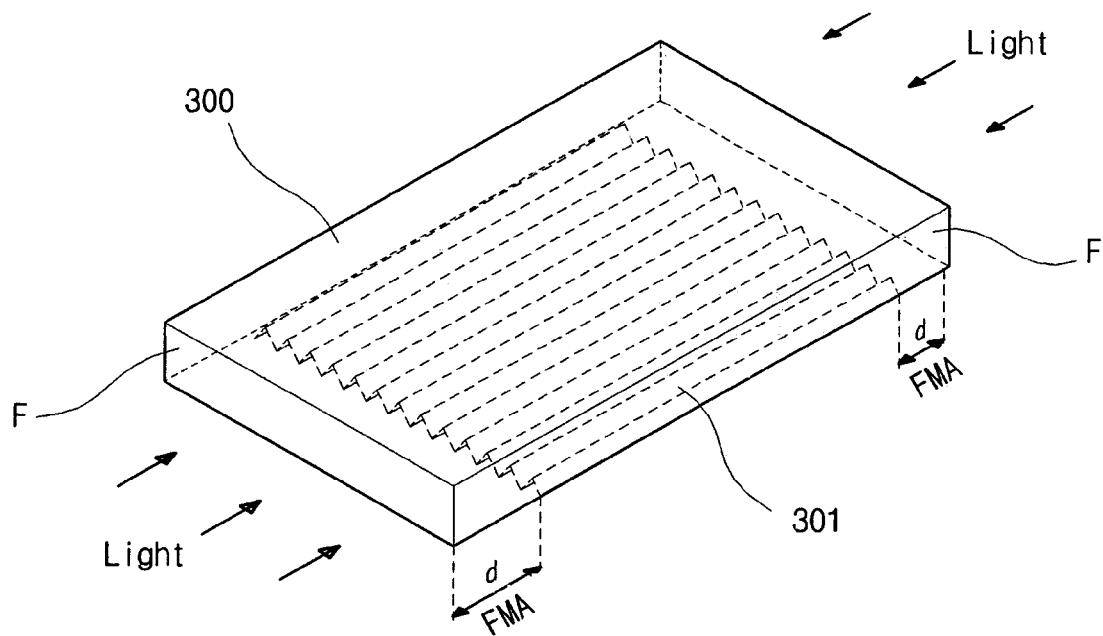

FIGS. 5A and 5B are upper perspective views of wedge-shaped prism light guide plates according to a first embodiment of the present invention. FIGS. 6A and 6B are upper perspective views of parallel prism light guide plates according to a second embodiment of the present invention. The first embodiment may be provided for a backlight unit including one lamp at a side of the prism light guide plate, and the second embodiment may be provided for a backlight unit including two lamps, one at each side of the prism light guide plate. Edge faces F of the prism light guide plates are irradiated by the lamps.

As shown in FIGS. 5A and 5B, the wedge-shaped prism light guide plates 150 and 250 include prisms 151 and 251 at lower surfaces thereof. In light-entering portions FMA of the prism light guide plates 150 and 250 adjacent the edge face F, on which light emitted from lamps (not shown) are first incident, there are no prisms. Thus, the light-entering portions FMA have even surfaces. A width d of each light-entering portion FMA that does not contain prisms may be within a range of about 0.5 mm to about 5 mm.

As illustrated, each prism 151 and 251 has first and second base sides and a third rectangular side. The third rectangular side of each prism 151 and 251 is attached to the lower surface of the prism light guide plate 150 and 250, so that each prism 151 and 251 has a cross section of an inverted triangular shape.

Each prism light guide plate 150 and 250 has the lamp only at one side thereof (opposite edge face F). Therefore, to provide uniform brightness with respect to substantially the entire surface of the prism light guide plate 150 and 250, the prism light guide plate 150 and 250 has a thicker thickness in the light-entering portion FMA than in an opposite portion. The prism light guide plate 150 and 250 has a deceasing thickness from the light-entering portion FMA to the opposite portion. Since there exist no prisms in the predetermined widths d of the light-entering portions FMA of the prism light guide plates 150 and 250, the light-condensing ability of the prism light guide plates 150 and 250 in the light-entering portions FMA is somewhat reduced.

The prisms 151 of FIG. 5A are arranged such that prism peaks of the prisms 151 having inverted triangular cross sections are perpendicular to a progressing direction of the incident light from the lamp. The progressing direction is the direction indicated by the arrows in FIGS. 5A and 5B, that is, essentially planar with the surfaces of the other sheets in the LCD device. Thus, the incident light impinges on the rectangular sides of the prisms 151. The prisms 251 of FIG. 5B are arranged such that prism peaks of the prisms 251 having inverted triangular cross sections are parallel to the progressing direction of the incident light from the lamp. Thus, in this case, the incident light impinges on the inverted triangular base sides of the prisms 251.

Next, as shown in FIGS. 6A and 6B, the prism light guide plates 200 and 300 have lamps (not shown) at both sides thereof. This is to say that one or more lamps are disposed at opposing sides of the prism light guide plates 200 and 300. The prism light guide plates 200 and 300 include prisms 201 and 301 at lower surfaces thereof. Since light enters the prism light guide plates 200 and 300 from both sides, the prism light guide plates 200 and 300 have two light-entering portions FMA, at least one at either side. In light-entering portions FMA of the prism light guide plates 200 and 300, there are no prisms. Thus, the light-entering portions FMA have even surfaces. A width d of each light-entering portion FMA including no prisms may be within a range of about 0.5 mm to about 5 mm.

The prisms 201 of FIG. 6A are arranged such that prism peaks of the prisms 201 having inverted triangular cross sections are perpendicular to the progressing direction of the incident light from the lamps, and thus the incident light impinges on the rectangular sides of the prisms 201. The prisms 301 of FIG. 6B are arranged such that prism peaks of the prisms 301 having inverted triangular cross sections are parallel to the progressing direction of the incident light from the lamps, and thus the incident light impinges on the inverted triangular base sides of the prisms 301.

Figure 7:
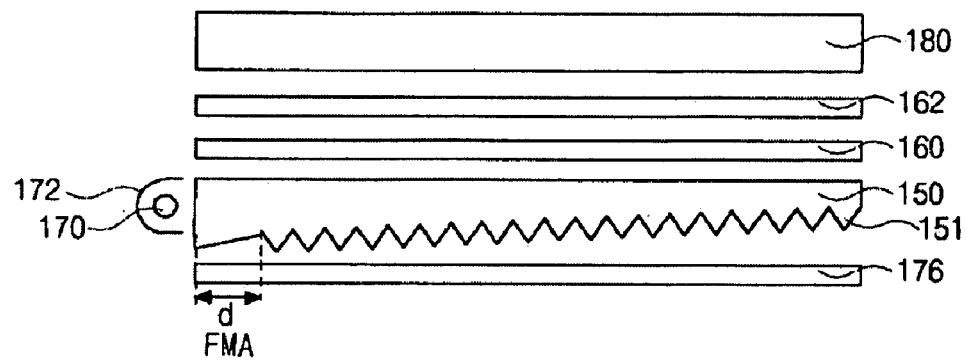
FIG. 7 is a cross-sectional view of a liquid crystal display device including a backlight unit according to an embodiment of the present invention.

FIG. 7 is a cross-sectional view of a liquid crystal display device including a backlight unit according to an embodiment of the present invention. As shown in FIG. 7, a lamp 170 is disposed at a side of a prism light guide plate 150, and a lamp housing 172 surrounds the lamp 170. The prism light guide plate 150 has prisms 151 at a lower surface thereof, and does not include the prisms 151 in the light-entering portion FMA adjacent the lamp 150. The light-entering portion FMA has a width d in the range of about 0.5 mm to about 5 mm or about 0.5 mm to about 3 mm, for example.

A prism sheet 160 including prisms (not shown) on an upper surface thereof is disposed over the prism light guide plate 150 such that prism peaks of the prism sheet 160 are perpendicular to prism peaks of the prism light guide plate 150. A passivation film 162 and a liquid crystal panel 180 are sequentially disposed over the prism sheet 160.

Figure 8A:
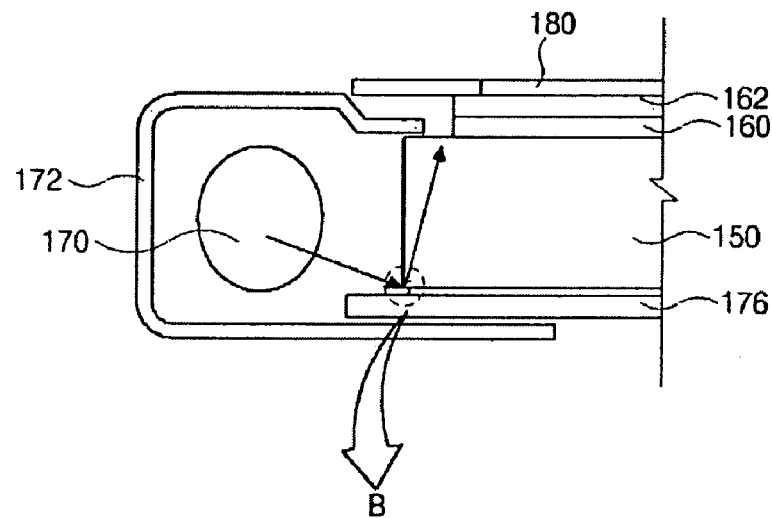
FIG. 8A is a cross-sectional view illustrating a part of the liquid crystal display device of FIG. 7.
Figure 8B:
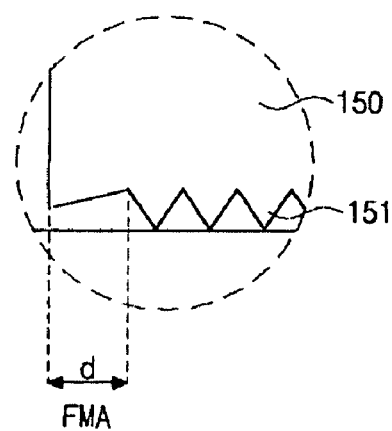
FIG. 8B is an enlarged view of the region "B" of FIG. 8A.

FIG. 8A is a cross-sectional view illustrating a part of the liquid crystal display device of FIG. 7. FIG. 8B is an enlarged view of the region "B" of FIG. 8A. In FIGS. 8A and 8B, a bottom case and a top case are not illustrated.

As shown in FIGS. 8A and 8B, a lamp 170 is disposed at a side of a prism light guide plate 150, and a lamp housing 172 covers the lamp 170 with an opening. The opening of the lamp housing 172 corresponds to the side of the prism light guide plate 150. The prism light guide plate 150 has prisms 151 of inverted triangular shapes on a lower surface thereof. In a light-entering portion FMA of the prism light guide plate 150 adjacent to the lamp 170, there are no prisms. A reflector 176 is disposed over the lower surface of the prism light guide plate 150. A prism sheet 160, a passivation film 162 and a liquid crystal panel 180 are sequentially disposed over an upper surface of the prism light guide plate 150.

A lower end of the lamp housing 172 partly overlaps the reflector 176 and an upper end of the lamp housing 172 contacts an end of the prism light guide plate 150. The prism sheet 160 and the passivation film 162 are spaced apart from the upper end of the lamp housing 172 and are in contact with the upper surface of the prism light guide plate 150.

In the above liquid crystal display device, since no prisms are present in the predetermined width d of the light-entering portion FMA of the prism light guide plate 150, for example, in a width of about 0.5 mm to 3 mm from an edge of the prism light guide plate 150, light-condensing ability of the prism light guide plate 150 in the light-entering portions FMA is somewhat reduced as compared with a portion in which the prisms 151 are formed. Thus, the light leakage around the edge of the liquid crystal panel 180 is prevented.

Figure 9:
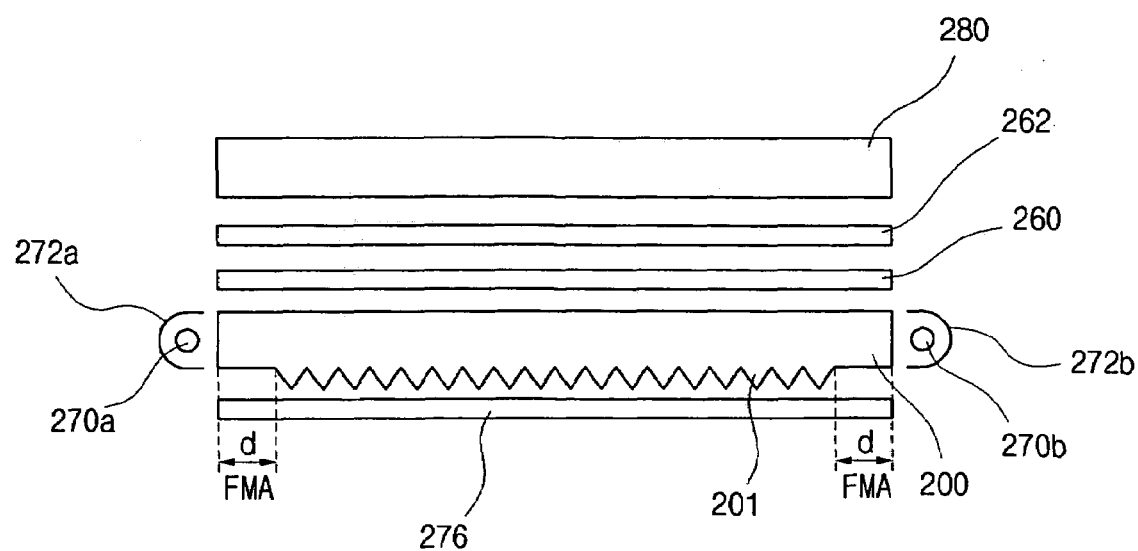
FIG. 9 is a cross-sectional view illustrating a liquid crystal display device including a backlight unit having multiple lamps according to an embodiment of the present invention.

As illustrated by the second embodiment, the liquid crystal display device may include a backlight unit having two lamps, one at each side of the prism light guide plate. Such a prism light guide plate has two flat light-entering portions at the sides thereof. Such an embodiment is shown in FIG. 9. In FIG. 9, lamps 270a, 270b face opposing ends of the prism light guide plate 200. Each lamp 270a, 270b is surrounded by a lamp housing 272a, 272b. A reflector 276 is disposed over the lower surface of the prism light guide plate 200 such that the prisms 201 are proximal to the reflector 276. A prism sheet 260, a passivation film 262 and a liquid crystal panel 280 are sequentially disposed over an upper surface of the prism light guide plate 200 similar to the embodiment shown in FIG. 7.

As shown in the figures, the light-entering portion FMA of the prism light guide plate 150 may be inclined or parallel to the upper surface of the light guide plate 150. If the light-entering portion FMA of the prism light guide plate 150 is inclined, the amount of incline is small in comparison with the length of the lower surface of the light guide plate 150. If the backlight assembly includes multiple lamps, fabrication of the lower surface of the light guide plate is more difficult, albeit still possible.

Although the present invention has been explained by the embodiments shown in the drawings and described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents. Formation of the structures illustrated and described herein using these methods is well within the skill of those of ordinary skill in the art.

What is claimed is:

1. A backlight unit comprising:
   a first lamp; and
   a light guide plate containing:
      a first edge face adjacent to the first lamp, and
      a lower surface having a first even surface extending from the first edge face and a portion on which prisms are disposed, the prism having a longitudinal direction,
      wherein the longitudinal direction of the prism is substantially in parallel with a direction from the first edge face to an edge face opposing the first edge face and the prisms have substantially identical depth.

2. The backlight unit according to claim 1, further comprising a second lamp adjacent to a second edge face of the light guide plate, the second edge face opposite to the first edge face, the lower surface of the light guide plate having a second even surface extending from the second edge face.

3. The backlight unit according to claim 1, wherein the first even surface is inclined with respect to an upper surface of the light guide plate.

4. The backlight unit according to claim 3, wherein a thickness of the light guide plate at the first edge face is thicker than a thickness of the light guide plate at an edge face opposing the first edge face.

5. The backlight unit according to claim 2, wherein thicknesses of the light guide plate at the first and second edge faces are the same.

6. The backlight unit according to claim 2, wherein the lower surface is symmetric around a center of the lower surface.

7. The backlight unit according to claim 6, wherein the first and second even surfaces each have a width of about 0.5 mm to about 5 mm from the first and second edge faces to the portion of the lower surface on which the prisms are disposed, respectively.

8. The backlight unit according to claim 6, wherein the first and second even surfaces are level with respect to an upper surface of the light guide plate.

9. The backlight unit according to claim 1, further comprising a prism sheet and a passivation film over an upper surface of the light guide plate.

10. The backlight unit according to claim 9, wherein prisms of the prism sheet extend in a direction substantially perpendicular to a direction in which prisms of the light guide plate extend.

11. The backlight unit according to claim 1, further comprising a reflector disposed such that light from the first lamp impinging on the reflector is reflected toward the light guide plate.

12. The backlight unit according to claim 11, wherein at least some of the prisms contact the reflector.

13. The backlight unit according to claim 1, wherein the first even surface has a width of about 0.5 mm to about 5 mm from the first edge face to the portion of the lower surface on which the prisms are disposed.

14. A backlight unit comprising:
   a first lamp; and
   a light guide plate containing:
      a first edge face adjacent to the first lamp and
      a lower surface having:
         a first portion extending from the first edge face, and
         a second portion on which prisms are disposed, the prism extending substantially in a direction from the first edge face to a second edge face opposing the first edge face, and
   a second lamp adjacent to the second edge face of the light guide plate, the lower surface of the light guide plate having a third portion extending from the second edge face, the third portion condensing light from the second lamp that has entered the light guide plate to a smaller extent than the second portion.

15. The backlight unit according to claim 14, wherein the first portion comprises a first even surface and the third portion comprises a second even surface and wherein the first and second even surfaces each have a width of about 0.5 mm to about 5 mm from the first and second edge faces to the portion of the lower surface on which the prisms are disposed, respectively.

16. The backlight unit according to claim 14, wherein thicknesses of the light guide plate at the first and second edge faces are the same.

17. The backlight unit according to claim 14, wherein the lower surface is symmetric around a center of the lower surface.

18. The backlight unit according to claim 14, wherein the first and second even surfaces are level with respect to an upper surface of the light guide plate.

19. The backlight unit according to claim 14, further comprising a prism sheet and a passivation film over an upper surface of the light guide plate.

20. The backlight unit according to claim 19, wherein prisms of the prism sheet extend in a direction substantially perpendicular to a direction in which prisms of the light guide plate extend.

21. The backlight unit according to claim 14, further comprising a reflector disposed such that light from the first lamp impinging on the reflector is reflected toward the light guide plate.

* * * * *